United States Patent

Wang et al.

Patent Number: 5,229,940
Date of Patent: Jul. 20, 1993

[54] METHOD OF EXTRACTING THREE DIMENSIONAL INFORMATION FROM A GRID OF TWO DIMENSIONAL SEISMIC DATA

[75] Inventors: Shein S. Wang; David W. Bell, both of Ponca City, Okla.

[73] Assignee: Conoco Inc., Ponca City, Okla.

[21] Appl. No.: 828,270

[22] Filed: Jan. 29, 1992

[51] Int. Cl.$^5$ .............................................. G01V 1/36
[52] U.S. Cl. .................................... 364/422; 364/421; 367/73
[58] Field of Search .................. 367/73; 364/421, 422

[56] References Cited

U.S. PATENT DOCUMENTS

| | | | |
|---|---|---|---|
| 4,330,872 | 5/1982 | Bratton | 367/43 |
| 4,672,545 | 6/1987 | Lin et al. | 364/421 |
| 4,736,347 | 4/1988 | Goldberg et al. | 367/46 |
| 4,866,659 | 9/1989 | Lin et al. | 364/421 |
| 4,907,205 | 3/1990 | Yanchak | 367/52 |
| 4,953,140 | 8/1990 | Dablain | 367/73 |
| 4,953,142 | 8/1990 | Rimmer | 367/73 |
| 4,964,089 | 10/1990 | Wang et al. | 367/73 |
| 4,964,097 | 10/1990 | Wang et al. | 367/73 |
| 4,964,103 | 10/1990 | Johnson | 367/53 |
| 4,992,995 | 10/1991 | Favret | 367/43 |
| 4,992,996 | 2/1991 | Wang et al. | 367/53 |
| 5,050,131 | 9/1991 | Wang et al. | 367/73 |
| 5,089,994 | 2/1992 | Harlan et al. | 367/73 |

Primary Examiner—Roy N. Envall, Jr.
Assistant Examiner—Gita D. Shingala

[57] ABSTRACT

A method for generating a three dimensional velocity model from a grid of two dimensional lines is presented. Each of the two dimensional lines is common offset depth migrated and the migrated common offset sections are sorted into common image point (CIP) gathers. The proposed method examines all the common image point gathers from all the two dimensional lines and extracts out of plane three dimensional information. An initial three dimensional model is constructed from the two dimensional depth sections by mapping the depth images of several reflectors from each two dimensional line. Ray tracing through this initial three dimensional model, the out of plane three dimensional information is used to compute a set of corrections to the boundaries in the three dimensional model. The three dimensional model boundaries are then iterated until all mismatches are minimized. The final model can be used for a final three dimensional depth migration, or as a three dimensional interpretation in agreement with all the two dimensional lines.

5 Claims, 6 Drawing Sheets

METHOD OF EXTRACTING THREE DIMENSIONAL INFORMATION FROM A GRID OF TWO DIMENSIONAL SEISMIC DATA

BACKGROUND OF THE INVENTION

1. Field of the Invention

The present invention pertains to developing three dimensional velocity models and more particularly to developing three dimensional information from a grid of two dimensional lines.

2. Related Prior Art

U.S. Pat. No. 4,330,872, titled "Common offset Distance Seismic Trace Filtering" issued to Robert H. Bratton relates to a multiple coverage seismic exploration technique that provides for a plurality of seismic trace recordings along a line of exploration. From these recordings, sets of common offset distance traces are gathered. Initial estimates are made of the apparent dips associated with the seismic reflection signals across each set of common offset distance traces. These initial dip estimates are smoothed and the sets of common offset distance traces filtered along the apparent dips associated with the smoothed dip estimates to enhance the signal to noise ratio of primary reflection signals.

U.S. Pat. No. 4,672,545, titled "Method and Apparatus for Synthesizing Three Dimensional Seismic Data", issued to Jia-Wen Lin, et al., relates to a method and apparatus for converting seismic data obtained at known points to synthesized seismic traces obtainable at arbitrarily selected points. Two dimensional seismic data are converted to three dimensional data with the aid of a programmed computer to permit generation of arbitrary views of particular geologic structure as well as a mathematical representation of the structure. In order to provide accurate interpolation from the known data, both apparent and true dip characteristics are obtained for the surveyed structure, and seismic trace data for a desired point are synthesized as a function of the dip of the surveyed structure. The dip characteristics are obtained from partial derivatives of the two dimensional data in specified coordinate directions. A three dimensional surface corresponding to the dip characteristics is obtained by a least squares fitting technique. The data obtained at the known points are weighted both by distance from the desired point and the semblance coefficients associated with dip for these points to synthesize the desired data.

U.S. Pat. No. 4,736,347, titled "Multiple Stacking and Spatial Mapping of Seismic Data", issued to Bernard Goldberg, et al., relates to a method where seismic traces are stacked in a plurality of orthogonal measures to form multiple stacked traces at a positive offset. The stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the ray paths at the surface to be calculated, as well as enabling the dip angles and spatial coordinates of the reflection points on the first reflecting boundary to be determined.

Seismic data corresponding to the second reflecting boundary are then spatially mapped to the first reflecting boundary by ray tracing and by a new method for calculating the apparent velocities at the first boundary. The process is repeated for each succeedingly deeper boundary. The derived acoustic velocity model of the earth is displayed as a stacked seismic section in spatial coordinates. This process may be applied to obtain earth models and seismic sections in both two and three dimensions.

U.S. Pat. No. 4,866,659, titled "Method for Selection of Mining and Drilling Sites Using Synthesized Three Dimensional Seismic Data", issued to Jia-Wen Lin, et al. relates to a method for converting seismic data obtained at known points to synthesized seismic traces obtainable at arbitrarily selected points. Two dimensional seismic data are converted to dense three dimensional data with the aid of a programmed computer to permit generation of arbitrary views of a particular geologic structure as well as a mathematical representation of the structure. The data is used to locate potential drilling and mining locations for drilling oil or other minerals. In order to provide accurate interpolation from the sparse two dimensional data, both apparent and true dip characteristics are obtained for the surveyed structure, and seismic trace data for a desired point are synthesized as a function of the dip of the surveyed structure. The dip characteristics are obtained from partial derivatives of the two dimensional data in specified coordinate directions. A three dimensional surface corresponding to the dip characteristics is obtained by a least squares fitting technique. The data obtained at the known points are weighted both by distance from the desired point and the semblance coefficients associated with the dip for these points to synthesize the desired data.

U.S. Pat. No. 4,953,140, titled "Method of Subterranean Mapping", issued to Mark A. Dablain, relates to a method for modeling the subterranean structure of the earth. Assumed velocities are used in initially modeling the path of seismic energy through the subterranean structure. Arrays of travel times corresponding to upward and downward going energy from various locations in the subterranean structure are calculated using ray tracing techniques. Actual reflection points are located when the sum of the upward and downward going travel times calculated with respect to a particular point in the structure equals the actual travel times recorded. The velocity assumptions are verified by selecting common reflection point records and adjusting the assumed velocities, such that reflection events on displayed traces from the common reflection point are horizontal. A least squares fit is used to correct the common reflection point event data until it is optimally flat.

U.S. Pat. No. 4,953,142, titled "Model Based Depth Processing of Seismic Data", issued to Daniel H. Rimmer, relates to a model based iterative method of depth processing seismic data. An estimate of a geologic horizon is entered into a three dimensional seismic model and synthetic shot records are determined from the model. Reflection tracks are estimated from the modeling results. The actual seismic traces are sorted into bins according to common reflection points determined from the reflection tracks and are stacked. The sorted and stacked data are used to estimate the difference between the seismic travel time and the model travel time, and the model is changed in order to match the seismic data. The process is repeated until the margin of error is acceptable. Lower horizons of interest are modeled in the same way until all the horizons of interest in a geological area are determined.

U.S. Pat. No. 4,964,097, titled "Three Dimensional Image Construction Using a Grid of Two Dimensional Depth Sections", issued to Shein S. Wang, et al., relates to a method for generating a three dimensional velocity model that makes use of two dimensional depth images, which are the result of two dimensional pre-stack depth migration, and corrects the out of plane distortion by ray tracing through a three dimensional model. The three dimensional model boundaries are iterated until the three dimensional effects ar minimized. The final model can be used for a final three dimensional prestack depth migration, or as a three dimensional interpretation of all the two dimensional depth migration results.

U.S. Pat. No. 4,964,103, titled "Three Dimensional Before Stack Depth Migration of Two Dimensional or Three Dimensional Seismic Data", issued to James H. Johnson, relates to a method of three dimensional before stack depth migration of two dimensional or three dimensional seismic data. Ray tracing is used to move before stack trace segments to their approximate three dimensional position. The trace segments are scaled to depth, binned, stacked and compared to the model The model can then be changed to match the depth trace segments which are stacked better, moved closer to their correct three dimensional position and compare better to the model.

U.S. Pat. No. 4,992,996, titled "Interval Velocity Analysis and Depth Migration Using Common Reflection Point Gathers", issued to Shein S. Wano, et al., relates to a method for performing velocity analysis while eliminating the effects on weak signals caused by strong signals. This method includes migrating each event of the pre-stack trace to a single location instead of all possible locations. This correct location is determined by ray-tracing through a velocity model. The input trace is divided into many windows, and each window is migrated to a place determined by ray-tracing the center of the window through the model. If the velocity model is accurate, each event will be migrated to the proper location yielding an accurate depth section with no migration artifacts. As a by-product, if the model is not accurate, the post-migrated parts (PMP's) provide a clean velocity analysis.

SUMMARY OF THE INVENTION

The present invention provides a method for generating a three dimensional velocity model from a grid of two dimensional lines. Each of the two dimensional lines is common offset depth migrated and the migrated common offset sections are sorted into common image point (CIP) gathers. The proposed method examines all the common image point gathers from all the two dimensional lines and extracts out of plane three dimensional information. An initial three dimensional model is constructed from the two dimensional depth sections by mapping the depth images of several reflectors from each two dimensional line. In ray tracing through this initial three dimensional model, the out-of-plane three dimensional information is used to compute a set of corrections to the boundaries in the three dimensional model. The three dimensional model boundaries are then iterated until all mismatches are minimized. The final model can be used for a final three dimensional depth migration, or as a three dimensional interpretation in agreement with all the two dimensional lines.

DESCRIPTION OF THE PREFERRED EMBODIMENT

The acquisition of a seismic line that is a true dip line is the exception rather than the rule. The result is that most reflections originate out of the vertical reflection plane, and the problem of out of plane events increases in severity with depth and structural complexity. A three dimensional pre-stack depth migration is needed to properly image all the reflecting boundaries.

It is an expensive process to generate a three dimensional velocity model through repetitive three dimensional depth migrations. Alternatively, one may pick travel times from stacked two dimensional sections and then apply map migration. However, in complex areas, events are broken up and picking the correct event from stacked traces is hard.

In contrast, by sorting pre-stack traces into common offset gathers and migrating each offset separately, stronger images can be obtained. These migrated common offset images can be sorted into common image point gathers. When the line is in the dip direction, the common image point gathers can be used as an indicator of velocity error so that a good velocity can be selected. This is illustrated in U.S. Pat. No. 4,992,996.

When the line is not in the dip direction, each offset will, in general, be reflecting from different three dimensional boundary points. Thus even when the velocity is correct, the event will not be flat because the distances to these reflecting points will be different.

The conventional velocity analysis method changes the local velocity to force the event to be flat, which is wrong. The present invention provides a method to derive three dimensional information from observed deviations from expected flatness, and properly correct the initial three dimensional velocity model using this information.

Figure 4:
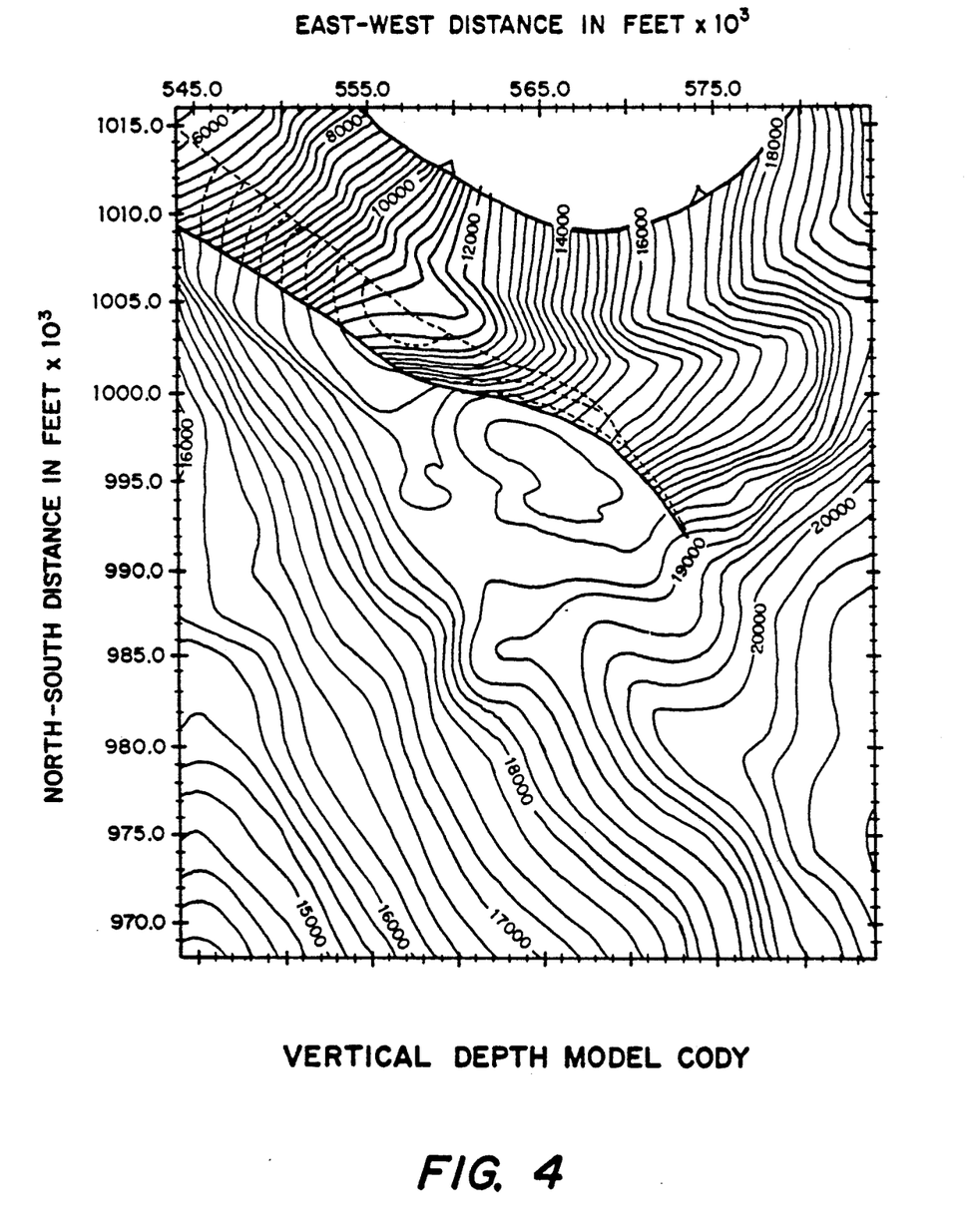
FIG. 4 illustrates a typical three dimensional horizon.

FIG. 4 illustrates a typical three dimensional horizon. In a typical three dimensional situation, such as FIG. 5, for two dimensional seismic lines, most of the zero offset rays for each common depth point are out of the plane of the seismic line. For this data, velocity analysis can be carried out using portions of the line marked as B, or the velocity from an existing well can be used.

In practice, the velocity is not known until after the whole model is completely built. At an earlier stage, several velocities might be chosen, each of the velocities flattens a different part of the two dimensional lines. Each of the velocities will be used to build a different model. The interpreter can choose the correct one from these models based on his understanding of the region.

By using all the offsets from all the CIP's, the model boundary at a large number of locations can be corrected. The new boundary is iterated again until the errors are minimized. The final boundary is then the best three dimensional boundary, in agreement with the three dimensional information contained in all the two dimensional seismic lines.

Current processing methods favor dip lines, but the method of the present invention can extract more information from non-dip portions of any two dimensional lines and make them useful.

Figure 1:
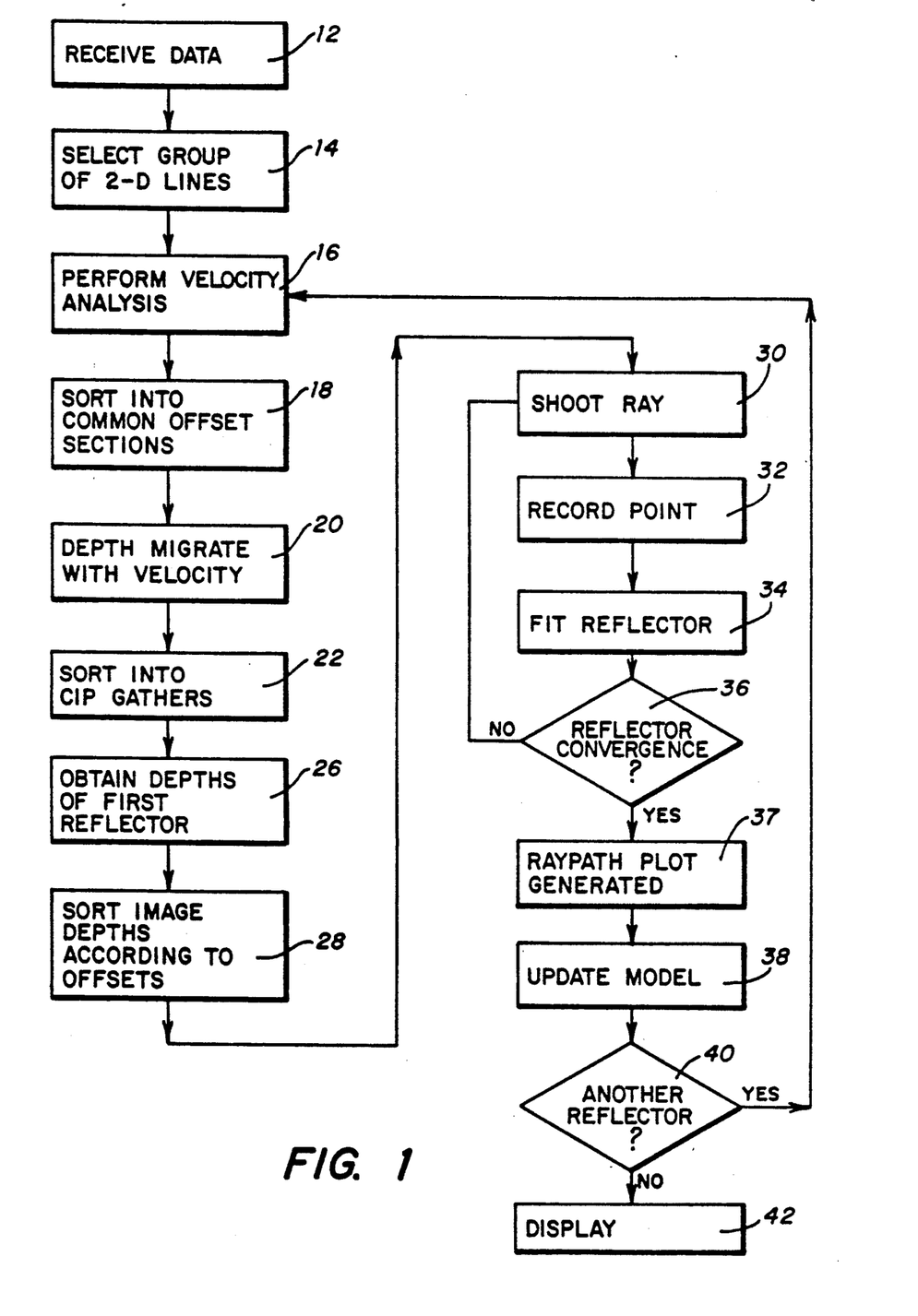
FIG. 1 is a flow chart of the method of the present invention illustrated in block form.

Referring now to FIG. 1, a flow chart of the method of the present invention is illustrated in block form. At block 12 data is received. This data may take the form of a grid of any two dimensional data currently found in the art.

At block 14 a group of two dimensional lines for analysis is selected. At block 16 a velocity analysis for the first layer of each two dimensional line is performed. One or several velocities for testing ma be selected at this juncture. For each of the chosen velocities, the following steps are performed.

Figure 2:
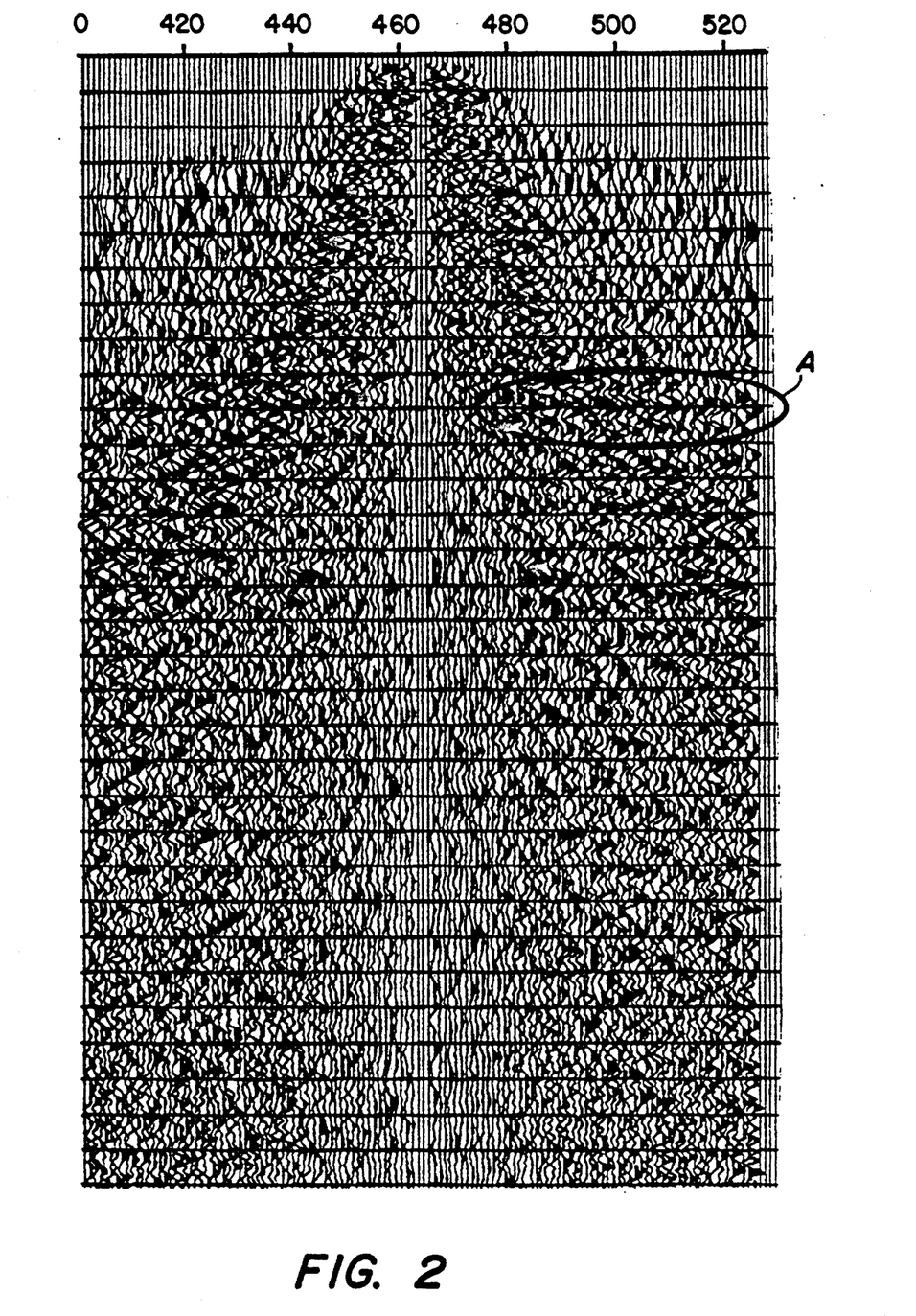
FIG. 2 is a seismogram illustrating a typical common image point gather where the velocity is believed to be correct.

At block 18 each two dimensional line is sorted into common offset sections. At block 20 each common offset is depth migrated with the selected velocity. At block 22 the results of block 20 are sorted into common image point gathers. At this block an image of first reflector is selected and the image depth from all common image point gathers is chosen for further processing. FIG. 2 illustrates a typical common image point gather having an area circled and labeled A where the velocity is correct.

Figure 3:
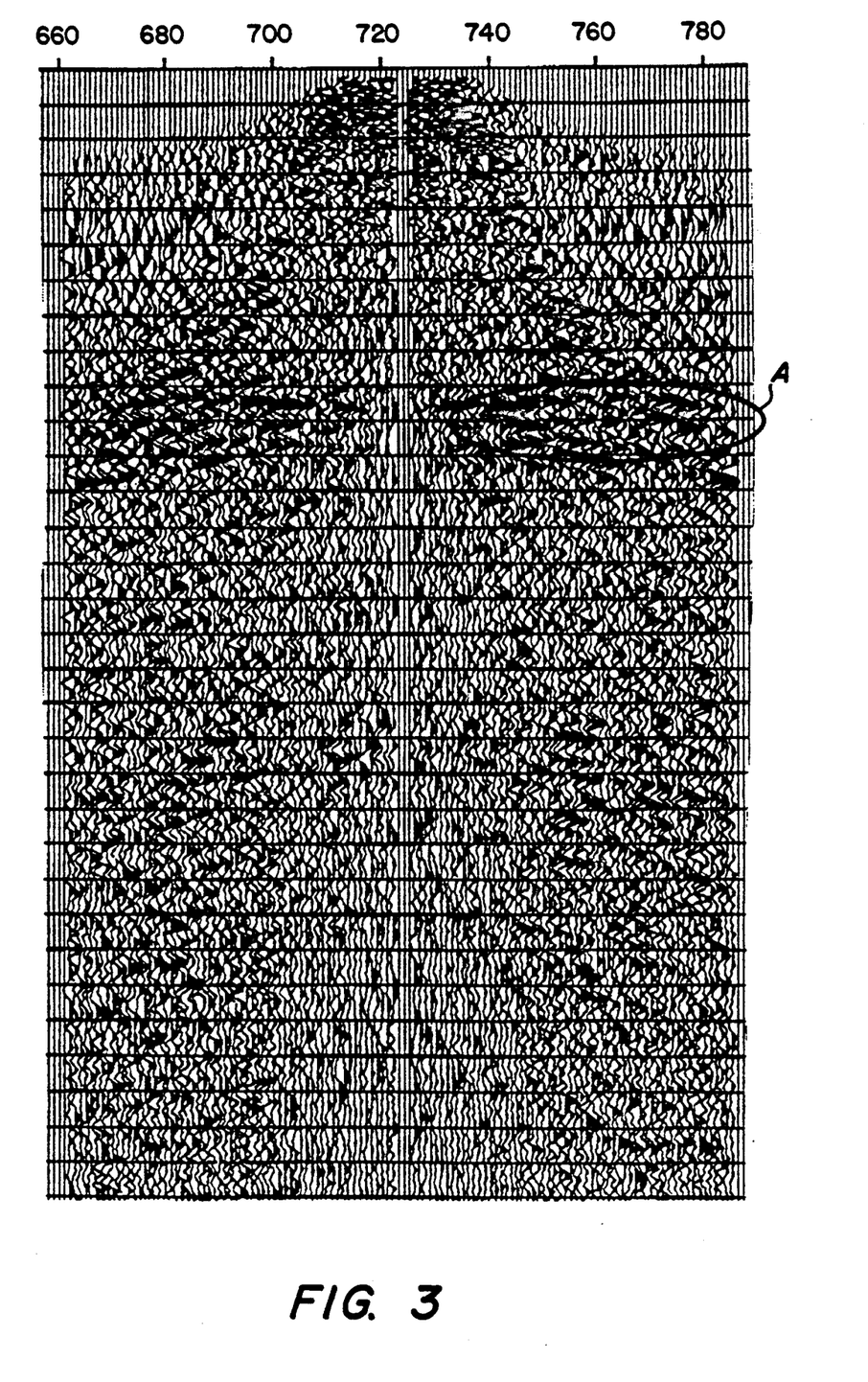
FIG. 3 illustrates a second common image point gather where the velocity is believed to be correct.

FIG. 3 is an additional seismogram illustrating a common image point gather where the velocity is believed to be correct. The circled event shows the change of the distances with offset.

At block 26 this image for each two dimensional line is examined to obtain the depths of the first reflector for every offset. Note, the depths are really the slant normal distances to the reflector, but the three dimensional reflector boundary will be initially constructed by placing it vertically under the line using the depths.

The next portion of the program is performed to properly locate the first reflector in three dimensions by iterations.

At block 28 the image depths picked in 22 are sorted according to offsets.

At block 30, for offset o, the depth $d_1$ picked on every common image point is noted and a ray is shot with the source and the receiver properly placed. The center of the source and receiver pair is located at the common image point. The ray should go from the source, reflect from the reflector in three dimensions and hit the receiver.

Figure 5:
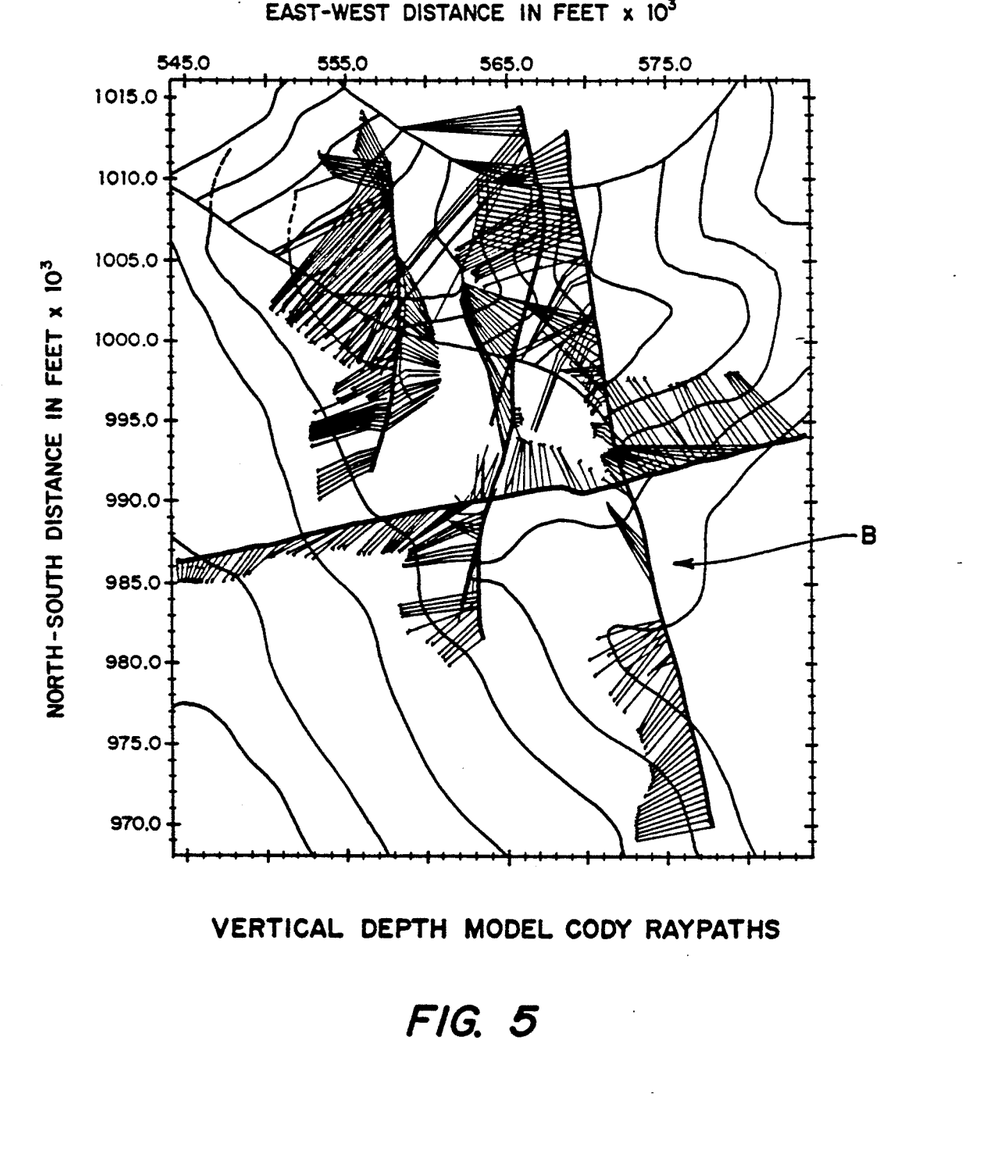
FIG. 5 illustrates four two dimensional seismic lines and the zero-offset rays for each common depth point.
Figure 6:
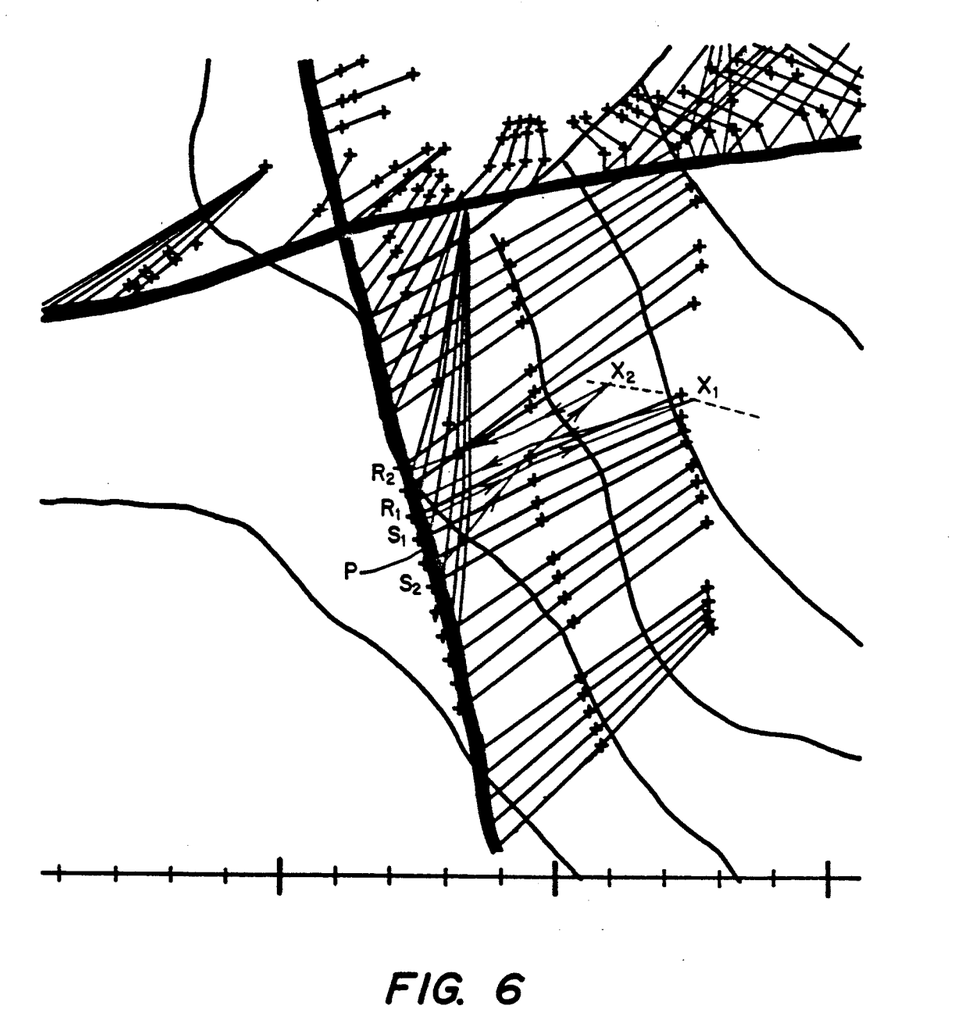
FIG. 6 illustrates a portion of FIG. 5 that has been enlarged to show more detail.

FIG. 6 illustrates a portion of FIG. 5 enlarged. Point P is a point where the corresponding CIP gather shows three dimensional effects. From this CIP gather, the distances $d_i$ for each offset i can be determined, where $d_i$ is the distance from P to the reflection point $X_1$ for offset i along the corresponding ray path. Two typical ray paths are shown. Ray 1 goes from source $S_1$ to reflection point $X_1$ then back to receiver $R_1$. The recorded distance from the CIP is $d_1$. Ray 2 goes from source $S_2$ to reflection point $X_2$ then back to receiver $R_2$. The recorded distance from the CIP is $d_2$.

The distance d along the ray path from point P, which dissects the segment ($S_1$, $R_1$), along the middle of the ray path to the reflection point $X_1$ can be measured. This distance should agree with $d_1$. If not, the difference indicates whether the model surface is too close or too far, and by how much. This correction should be made along the central ray path, the same ray path along which the distance has been measured.

At block 32 the point of reflection $X_1$ for offset 1 and its depth $d_1$ is noted. The procedure described above about FIG. 6 is used to compare the two values d and $d_1$ for correcting the location of the reflector at $X_1$. This is done for every corresponding reflection point $X_i$ for the corresponding offset i in the same common image point gather. All other common image point gathers ar similarly processed.

At block 34 a new reflector is fitted through all the reflection points X. At block 36 the new reflector is tested. If it is sufficiently different from the old reflector, the program returns to block 30 and the process is repeated until convergence is achieved.

At block 37 raypath plot similar to FIG. 5 is generated based on the reflector position and the velocity selected in block 20. A region such as B is selected where the three dimensional effect is minimal and where the velocity selected should provide a flat image in the conventional velocity analysis such as outlined in U.S. Pat. No. 4,992,996. If the selected velocity is not acceptable, the correct one is selected and the program returns to block 20.

At block 38 a correct velocity and a correct reflector have been obtained which agree with all the information contained in the grid of two dimensional lines. The three dimensional velocity model is updated with the velocity/reflector and the program proceeds to the next layer.

At block 40 whether there is another reflector is determined. If another reflector exists, the program returns to block 16 and the process is repeated for this reflector and the boundary determined is added to the three dimensional and two dimensional models.

If no additional reflectors exist, the completed model may be displayed at block 42.

Presently, there is an abundance of two dimensional surveys which cannot be three dimensional depth migrated. A new three dimensional survey needs to be shot and processed from the beginning. Using the method of the present invention, a three dimensional model can be built from the existing two dimensional lines. The density of reflection points on each three dimensional boundary indicates the reliability. Thus, a three dimensional survey is only needed if the target zone lies inside a sparsely covered part of the model. In such case, probably a much smaller three dimensional survey can be designed using the model to cover the "holes" which could significantly reduce the cost of the survey.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A method for extracting three dimensional information from a grid of two dimensional seismic data comprising the steps of:
   receiving two dimensional seismic data;
   selecting a group of two dimensional lines for analysis;
   selecting a velocity for a first layer of each two dimensional line in said group of two dimensional lines;

sorting said each two dimensional line into common offset sections;

depth migrating each of said common offset sections with said selected velocity;

sorting said depth migrated common offset sections into common image point gathers to obtain an image of a reflector;

choosing a first image depth from said image of said reflector for all said common image point gathers for further processing;

locating said image of said reflector in three dimensions by iterations to achieve convergence;

using said image of said reflector located in three dimensions for each s id two dimensional line to update the model for each line; and displaying said updated model.

2. The method according to claim 1 wherein said locating said reflector includes the steps of:

sorting said first image depths according to offsets;

shooting a ray for each said offset from a source to said reflector at a second image depth and to said receiver;

comparing said first image depth and said second image depth to correct the location of said common image points on said reflector; and fitting said reflector through all said corrected common image points.

3. An apparatus method for extracting three dimensional information from a grid of two dimensional seismic data comprising:

means for receiving two dimensional seismic data;

means for selecting a group of two dimensional lines for analysis;

means for selecting a velocity for the first layer of each of said two dimensional lines;

means for sorting said each of said two dimensional lines into common offset sections;

means for depth migrating each of said common offset sections with said selected velocity;

means for sorting said depth migrated common offset sections into common image point gathers to obtain an image of a reflector;

means for choosing a first image depth from said image of said reflector for all said common image point gathers for further processing;

means for locating said reflector in three dimensions by iterations to achieve convergence;

means for using said reflector located in three dimensions for each said two dimensional line to update the model for each line; and display for displaying said updated model.

4. The apparatus according to claim 3 wherein said means for locating said reflector includes:

means for sorting said first image depths according to offsets;

means for shooting a ray for each said offset from a source to said reflector at a second image depth and to said receiver;

means for comparing said first image depth and said second image depth to correct the common image point location on said reflector; and means for fitting said reflector through all said corrected common image point locations.

5. A method for extracting three dimensional information from a grid of two dimensional seismic data comprising the steps of:

receiving two dimensional seismic data;

selecting a model of a group of two dimensional lines from said seismic data for analysis;

selecting a velocity for a first layer of each of said two dimensional lines;

sorting each of said two dimensional lines into common offset sections;

depth migrating each of said common offset sections with said selected velocity;

sorting said depth migrated common offset sections into common image point gathers to obtain an image of a reflector;

choosing a first image depth for all said common image point gathers for further processing;

locating said reflector in three dimensions by iterations to achieve convergence;

using said reflector located in three dimensions for each said two dimensional lines to update the model and generate a three dimensional model for each line; and displaying said updated and three dimensional model.

* * * * *